(12) United States Patent
Günther et al.

(10) Patent No.: US 11,148,623 B2
(45) Date of Patent: Oct. 19, 2021

(54) BUMPER CROSS-MEMBER

(71) Applicant: Kirchhoff Automotive Deutschland GmbH, Attendorn (DE)

(72) Inventors: Alexander Günther, Olpe (DE); Marco Töller, Cologne (DE); Maria Schmitt, Attendorn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 54 days.

(21) Appl. No.: 16/633,769

(22) PCT Filed: Aug. 7, 2018

(86) PCT No.: PCT/EP2018/071410
§ 371 (c)(1),
(2) Date: Jan. 24, 2020

(87) PCT Pub. No.: WO2019/034483
PCT Pub. Date: Feb. 21, 2019

(65) Prior Publication Data
US 2020/0231107 A1 Jul. 23, 2020

(30) Foreign Application Priority Data
Aug. 14, 2017 (DE) .......................... 102017118514.3

(51) Int. Cl.
B60R 19/18 (2006.01)
B60R 19/02 (2006.01)
(Continued)

(52) U.S. Cl.
CPC ............ *B60R 19/18* (2013.01); *B60R 19/023* (2013.01); *B60R 19/04* (2013.01); *B60R 19/52* (2013.01)

(58) Field of Classification Search
CPC ....... B60R 19/18; B60R 19/023; B60R 19/04; B60R 19/52
See application file for complete search history.

(56) References Cited

U.S. PATENT DOCUMENTS 8,950,794 B2   2/2015   Lenkenhoff
9,446,799 B2   9/2016   Franzpötter
(Continued)

FOREIGN PATENT DOCUMENTS

DE        10226756 A1     1/2004
DE      102010055094 A1   7/2011
(Continued)

OTHER PUBLICATIONS

U.S. Appl. No. 16/637,135, filed Feb. 6, 2020 (Töller), applicant Kirchhoff Automotive Deutschland GmbH. Per USPTO waiver of Rule 1.98(a)(2)(iii) requirement.
(Continued)

*Primary Examiner* — D Glenn Dayoan
*Assistant Examiner* — Melissa Ann Bonifazi
(74) *Attorney, Agent, or Firm* — Polson Intellectual Property Law, PC; Margaret Polson; Christopher Sylvain

(57) ABSTRACT

A bumper cross-member for a vehicle having an outer shell and an inner shell connected to the outer shell and having a cut-out section which comprises at least one cut-out passing through the bumper cross-member in the x-direction. The bumper cross-member is divided in the z-direction thereof into at least three sections, of which a first and a second hollow chamber section are separated by a cut-out section located between them.

21 Claims, 2 Drawing Sheets

(51) Int. Cl.
*B60R 19/04* (2006.01)
*B60R 19/52* (2006.01)

(56) References Cited

U.S. PATENT DOCUMENTS

| | | |
|---|---|---|
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 2017/0088074 A1 | 3/2017 | Borghi |
| 2019/0185060 A1 | 6/2019 | Gündogan |
| 2019/0344385 A1 | 11/2019 | Töller |

FOREIGN PATENT DOCUMENTS

| | | |
|---|---|---|
| DE | 102011104205 A1 | 12/2012 |
| FR | 2916723 A1 | 12/2008 |

OTHER PUBLICATIONS

U.S. Appl. No. 16/636,623, filed Feb. 4, 2020 (Günther), applicant Kirchhoff Automotive Deutschland GmbH. Per USPTO waiver of Rule 1.98(a)(2)(iii) requirement.
International Search Report dated Sep. 26, 2018 in parent International application PCT/EP2018/071410.
International Preliminary Report on Patentability dated Aug. 16, 2019 in parent International application PCT/EP2018/071410.

BUMPER CROSS-MEMBER

BACKGROUND

The present disclosure relates to a bumper cross-member for a vehicle, which bumper cross member has an outer shell and an inner shell connected to the outer shell and further has a cut-out portion, which comprises at least one cut-out passing through the bumper cross-member in the x-direction.

Motor vehicles are equipped with a bumper assembly in the region of the front end to protect the safety cell of a vehicle and any units located in front of it, such as the engine, the radiator and the like. Such a bumper assembly includes a bumper cross-member, which extends along the width of the vehicle and is connected to side member components of the vehicle. These side member components may be so-called crash boxes which absorb impact energy by plastic deformation if a specific impact energy is exceeded. Such a bumper cross-member is typically covered on the vehicle exterior by a cladding shell made of plastic.

The connection of such a bumper cross-member to the side members located in the side regions of a vehicle forms a main path for absorbing kinetic energy in the event of an impact. Efforts to design vehicles to be collision compatible entail that impact energy must be absorbed via a greater vertical extension (z-direction of the vehicle). The greater vertical extension of such bumper cross-members is to improve collision compatibility of different vehicles. To this end, crash management systems were designed which, in addition to a main load path, have one or two secondary load paths spaced apart in the vertical direction. These paths also absorb energy, namely in a plane below and/or above the main load path, depending on the design. To fulfill the demand for better collision compatibility between different vehicles, each load path can be assigned its own bumper cross-member. These are arranged at a spacing from each other. Such a design of a collision compatible bumper cross-member or such an assembly is necessary in such vehicles where a single bumper cross-member cannot extend over the entire height to be bridged to allow air flow, e.g. to the radiators in the front end.

The secondary load paths are typically provided by side member components having a smaller cross section area than the side member components of the main load path. Therefore the side member components forming such a secondary load path can be deformed at a smaller force and are thus more flexible. It would be desirable, however, if the resilience of such a bumper assembly were as homogeneous as possible over its height.

A bumper cross-member for a motor vehicle, particularly for passenger cars, is known from DE 10 2011 104 205 A1, which has an outer shell and an inner shell connected to the outer shell, wherein at least one shell has air passage openings in the vehicle direction. It is a disadvantage of such a cross-member, however, that it does not contribute to improving collision compatibility, particularly because it only includes a main load and a short vertical extension.

Based on the prior art of DE 10 2011 104 205 A1, it is therefore an aspect of the present disclosure to develop a bumper cross-member of the type mentioned at the outset in such a manner that it not only allows force introduction into the load path(s) over a greater height but also allows air to flow to the units arranged behind the bumper cross-member, for example a radiator.

SUMMARY

The above aspect is provided, according to the present disclosure, by a bumper cross-member comprising an outer shell and an inner shell connected to the outer shell and further having a cut-out portion, which has at least one cut-out passing through the bumper cross-member in the x-direction, wherein the bumper cross-member is divided into at least three sections in its z-direction, a first and second hollow chamber section of which are separated by the cut-out section located between them.

The directions used herein—the x-direction, the y-direction, and the z-direction—are the coordinate directions of a vehicle, wherein the x-direction is the longitudinal extension, the y-direction is the lateral extension, and the z-direction is the vertical extension (normal axis) of the vehicle. This coordinate system is applied likewise to the description of the bumper cross-member.

The term "cut-out" used herein includes any and all openings provided in the bumper cross-member, regardless of their type, which penetrate the bumper cross-member in the direction of travel and thus in the x-direction. This may for example be openings having a peripheral wall extending into the bumper cross-member. Another option is that the two shells have flush aligned openings without a collar or wall molded thereto, which openings may for example be introduced into the respective shell by laser cutting, milling, or the like.

The bumper cross-member according to the present disclosure is divided into different sections in its vertical extension and thus in its z-direction. A first section and a second section are designed as continuous hollow chamber sections in the transverse direction (y-direction). A cut-out section is located between these two hollow chamber sections. As a generic type, this cut-out section includes at least one cut-out penetrating the bumper cross-member in the x-direction. This cut-out ensures air flow permeability, such that air will flow to one or more vehicle units located behind the bumper cross-member, such as a radiator, particularly if these units are arranged directly behind the cut-out. It is a special feature that the at least one cut-out can be designed as a reinforcing structure, at the same time reinforcing at least one of the two shells of the bumper cross-member. This is achieved in that the at least one cut-out is framed by a peripheral wall section molded with a transition radius to the flat side of the shell facing the other shell in at least one of the two shells. In one embodiment of the bumper cross-member, which is composed of two shells, sections of the cut-out section that are adjacent to such a cut-out in the y-direction form a joint hollow chamber with the two hollow chamber sections that are adjacent in the z-direction. These sections connect the two hollow chamber sections which are spaced apart by the cut-out section, thus representing bridges between these hollow chamber sections within the cut-out section. Such a hollow chamber therefore extends across the entire height of the bumper cross-member.

In another embodiment, the bumper cross-member is produced by a multi-chamber, particularly a three-chamber, hollow chamber profile and is typically extrusion-molded. The cut-outs therefore are located in the middle chamber. Such an embodiment, unlike an embodiment of the bumper cross-member composed of two separately produced shells, does not have regions next to such a cut-out which connect the upper hollow chamber section to the lower hollow chamber section. In one embodiment of the bumper cross-member as a multi-chamber extruded profile, the outer shell and the inner shell are part of the same.

In a preferred embodiment, the cut-out is provided by forming the at least one cut-out in both shells. Due to its cut-out section, such a bumper cross-member can also be designed with a height covering units to which air is to flow without blocking the necessary air flow from these units. The at least one cut-out provided as a reinforcing structure contributes together with the adjacent hollow chamber sections of the cut-out section to reinforcement even against torsional stress and off-center stress with respect to the height of the bumper cross-member. If the bumper cross-member is connected to the vehicle via one main load path only, its design described above ensures that energy from an impact in the hollow chamber section to which no side member parts are connected is fed into the main load path, particularly without having to fear that the hollow chamber section not connected to the side member bends with respect to the hollow chamber section which is connected to the side members. Due to its concept, such a bumper cross-member is also suitable for a vehicle crash management in which at least one secondary load path is provided in addition to a main load path. In such a case, the one hollow chamber profile is connected to the side member sections defining the main load path, while the other hollow chamber profile is connected to side member sections of the secondary load path. Such a secondary load path may be arranged above and/or below the main load path. The advantages of this bumper cross-member described above regarding uniform force introduction when said member is connected to a main load path only occur likewise when the bumper cross-member is also connected to side member profile parts which provide a secondary load path and which can already be plastically deformed with less energy.

In a further embodiment of such a bumper cross-member, said cross-member, in addition to its first hollow chamber section, which is connected to a side member of the main load path, and its second hollow chamber section, which is spaced apart from the first by the cut-out section, comprises a third hollow chamber section which is also spaced apart by a cut-out section from the first hollow chamber section. Viewed in the z-direction, the one hollow chamber section in such a bumper cross-member is located above the hollow chamber section connected to the side members of the main load path and another one is located below it, each of which being separated by a cut-out section from the central hollow chamber section. In such an embodiment, the side members of a secondary load path may be connected to each of the two hollow chamber sections separated by a cut-out section from the first hollow chamber section.

To improve the reinforcement of the cut-outs, it is envisaged in one embodiment that the wall section framing the at least one cut-out, together with its transition radius to the flat extension of the respective shell, is designed like a cranked or bended portion and thus has an S-shaped cross section. This makes it possible that the free end of this wall section can flatly abut with the inner side of the other shell and that the two shells can thus be connected to each other, even in the cut-outs, for example by joining (welding).

The at least one cut-out typically has a preferred direction, namely such a direction that follows the longitudinal extension of the bumper cross-member. The preferred direction thus runs in the y-direction. Such a cut-out is then typically designed as an oblong hole. An elliptical design is also conceivable. If the cross sectional area through which air can flow is to be kept as large as possible in the cut-out section across the width of the bumper cross-member, two cut-outs may be provided which have a relatively long extension in the y-direction and which are separated from each other in the center of the bumper cross-member. The cut-outs end at a spacing from the end caps of the bumper cross-member. In such an embodiment, the bumper cross-member thus has three bridge sections in which it forms a joint hollow chamber in the z-direction together with its two hollow chamber sections. In another embodiment in which the cross sectional area of the cut-outs also is particularly great, a central cut-out and two cut-outs arranged to its sides and spaced apart from the central cut-out are provided. In this embodiment, the bumper cross-member has four sections in which it has a continuous hollow chamber along its vertical extension.

The vertical extension and the horizontal extension of the hollow chambers of such a bumper cross-member may be different in design. Typically, the hollow chamber profile section to which the main load path is connected has a greater vertical extension than the at least one other hollow chamber section which is separated from the former by a cut-out section.

It is also understood that the first hollow chamber section can be the lower or the upper hollow chamber section of the bumper cross-member and have connecting points for connecting a side member part. It is also conceivable that the connecting points mentioned above are designed for connecting a respective crash element.

The ends of the bumper cross-member can be closed. Designs with open ends are likewise possible.

BRIEF DESCRIPTION OF THE DRAWINGS

The present disclosure is described below using an example embodiment with reference to the appended figures, wherein.

DETAILED DESCRIPTION

Figure 1:
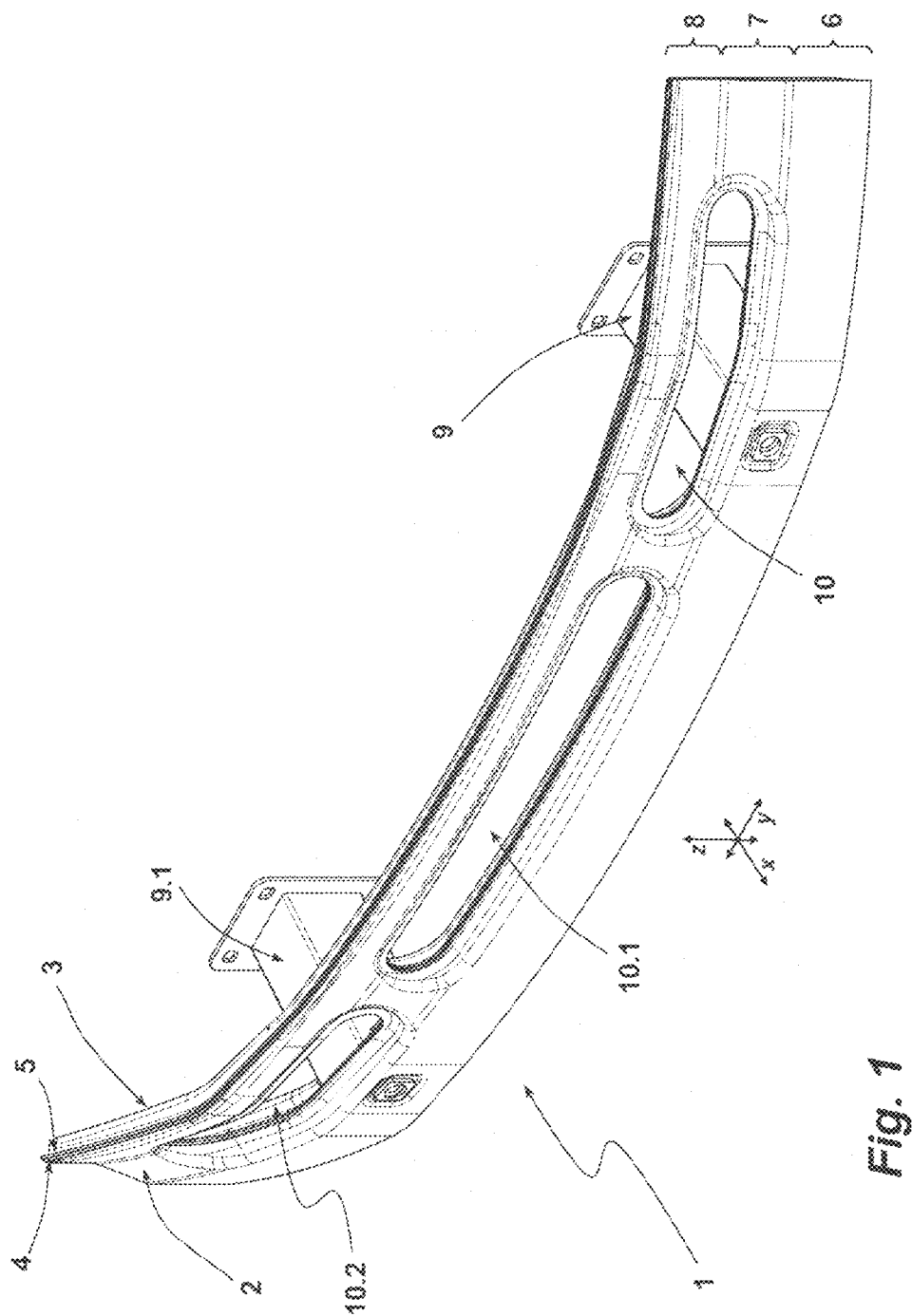
FIG. 1 shows a perspective view of a bumper cross-member according to the present disclosure with crash boxes connected thereto.

With reference to FIG. 1, a bumper cross-member 1 is composed of two shells, namely of an outer shell 2 and an inner shell 3. In the embodiment shown, the two shells 2, 3 are formed aluminum sheet components. Both shells 2, 3 have connecting flanges 4, 5; 4.1, 5.1 on their top and bottom sides, which flanges lie flat against each other and at which the two shells 2, 3 are connected to each other by a welding process (see also FIG. 3). The two shells 2, 3 enclose a side member cavity.

The bumper cross-member 1 of the embodiment shown is divided into three sections in the vertical direction (z-directional) The lowest section 6 is provided by a hollow chamber section 6. This section is designed as a hollow chamber extending across the longitudinal extension of the bumper cross-member 1 and thus in the y-direction. Above this hollow chamber section 6 is a cut-out section 7, which again is followed in the z-direction by another hollow chamber section 8. The hollow chamber section 8 is structured like the hollow chamber section 6 but has a shorter vertical extension. In the embodiment shown, the lower hollow chamber section 6 is dimensioned at a greater height, since it is designed to be connected to side member parts—in the embodiment shown to crash boxes 9, 9.1. The crash boxes 9, 9.1 can be connected to vehicle-side side members (not shown) using a connecting plate.

Figure 2:
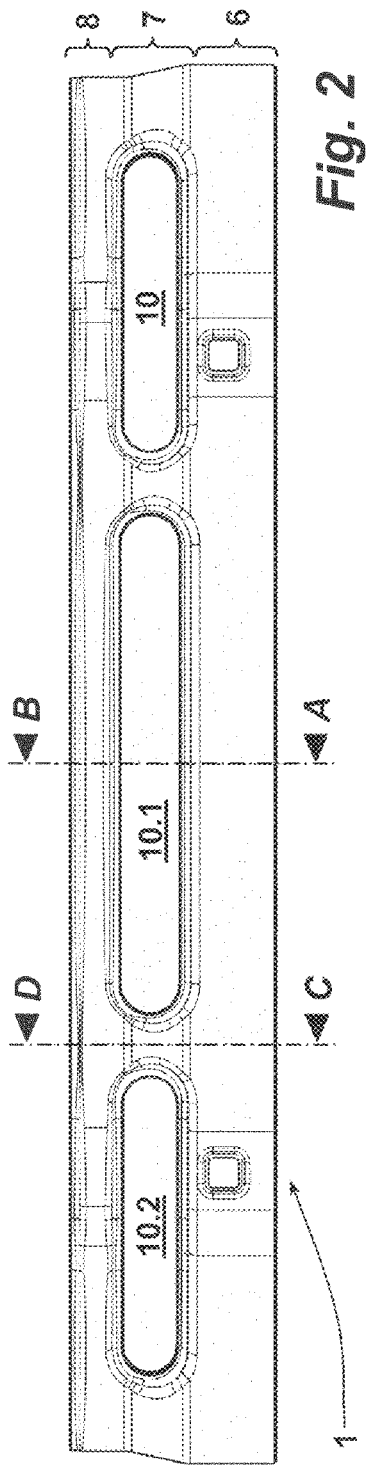
FIG. 2 shows a front view of the bumper cross-member of FIG. 1.

The cut-out section 7 is in principle also designed as a hollow chamber, wherein the hollow chamber extending in the y-direction is interrupted by providing cut-outs 10, 10.1, 10.2. The cut-outs 10, 10.1, 10.2 are used to allow the passage of air flow. Vehicle-side units to which air is to flow, such as a radiator or the like, may be located behind the cut-outs 10, 10.1, 10.2. At the same time, the cut-outs 10, 10.1, 10.2 can also be used to facilitate the assembly of vehicle-side units located behind them, such as crash boxes or engine-associated units. In the embodiment shown, the cut-outs 10, 10.1, 10.2 are each provided by a respective forming process in both shells 2, 3. The cut-outs 10, 10.1, 10.2 are designed as oblong holes and have a preferred direction which points in the y-direction of the bumper cross-member 1. In the embodiment shown, the cut-outs 10, 10.1, 10.2 extend over about 80% of the longitudinal extension of the cut-out section 7 (see FIG. 2). The structure of the bumper cross-member 1 is described below with respect to the formation of the cut-outs 10, 10.1, 10.2 based on the sectional views of FIGS. 3 and 4.

Figure 3:
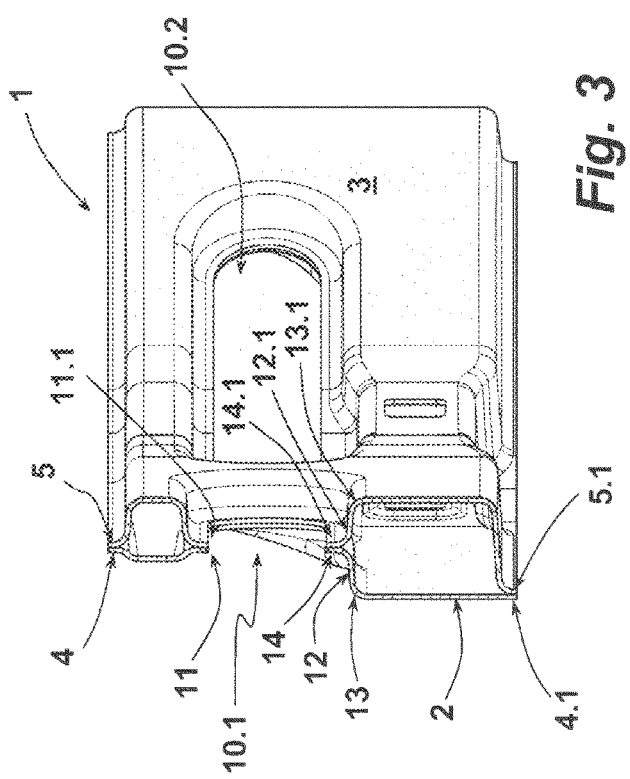
FIG. 3 shows a sectional view along the line A-B of the bumper cross-member of FIG. 2.

The cross-sectional representation of FIG. 3 shows a sectional view of the bumper cross-member 1 in the region of the cut-out 10.1. Each shell 2, 3 is shaped accordingly to form the cut-out 10.1, and the same applies to the cut-outs 10, 10.2. In the region of the cut-out 10.1, each shell 2, 3 comprises a peripheral wall section 12, 12.1, respectively, which surrounds the actual cut-out opening 11 for the shell 2 and 11.1 for the shell 3, and extends from the outside termination of its shell in the direction of the respective other shell 3 or 2. Each wall section 12, 12.1 is molded to the outward facing flat side of the respective shell 2, 3 with a transition radius section 13, 13.1. In the embodiment shown, the peripheral wall sections 12, 12.1 with their respective transition radius sections 13, 13.1 are designed like cranked or bended portions and thus have an S-shaped cross section. In this manner, a peripheral connecting flange 14, 14.1 projecting towards the cut-out opening 11, 11.1 of each shell 2, 3 is formed on each shell 2, 3. The connecting flanges 14, 14.1 lie flatly against each other. The connecting flanges 14, 14.1 are connected to each other by a welding process like the connecting flanges 4, 5 and 4.1, 5.1. In this manner, the two shells 2, 3 of the bumper cross-member 1 are not just connected like conventional bumper cross-members in the regions of their upper and lower ends but also in the cut-out enclosures. This gives the bumper cross-member 1 particularly stability and stiffness, since relative movements of the two shells 2, 3 are blocked. Furthermore, the inwardly chamfered peripheral wall sections 12, 12.1 on the flat sides of the shells 2, 3 significantly contribute to stiffening the bumper cross-member. The joint between the two shells 2, 3 can be a continuous welded seam. It is likewise possible to produce a welded seam by a series of spot weldings or as a stitched weld joint. Since the connecting flanges 4, 5; 4.1, 5.1; 14, 14.1 lie flat against each other, the two shells 2, 3 may also be completely or partially glued to each other or joined in another manner.

Figure 4:
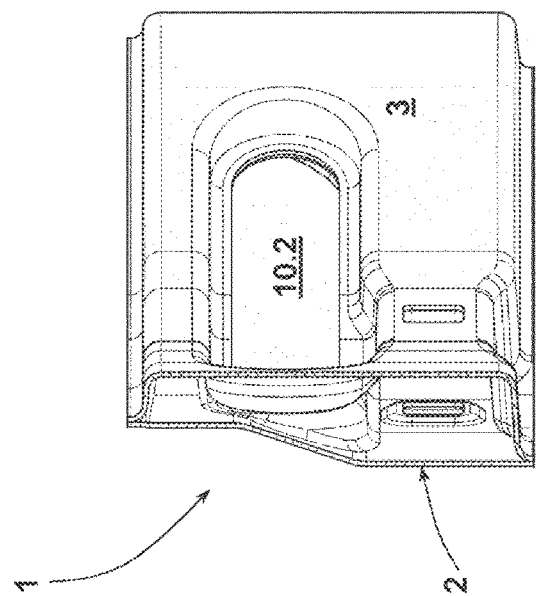
FIG. 4 shows a sectional view along the line C-D of the bumper cross-member of FIG. 2.

For the bumper cross-member 1 to respond uniformly (globally) across its entire front surface to an impact, the sections of the cut-out section 7 located next to the cut-outs 10, 10.1, 10.2 in the y-direction are designed as hollow chambers extending over the entire height (z-direction) of the bumper cross-member, as shown in the sectional view of FIG. 4. Thus the hollow chamber sections 6, 8 form a joint hollow chamber with the cut-out section 7 in these intermediate cut-out sections. These hollow chambers connecting the hollow chamber sections 6, 8 via the cut-out section 7, or the respective shell regions framing them, ensure uniform behavior of the bumper cross-member 1 in an impact affecting the hollow chamber section 6 or the hollow chamber section 8 only and thus ensure uniform introduction of the force to be absorbed into the crash boxes 9, 9.1.

FIGS. 3 and 4 do not show the crash box 9.1 for the sake of clarity.

A bumper cross-member according to the present disclosure can be used at the front or rear of a vehicle.

In the embodiment shown in the figures, the two shells 2, 3 are designed as aluminum components. A bumper cross-member according to the present disclosure can also be produced of shells of another material, such as sheet steel components or composite materials. It is likewise possible that the two shells are made of different materials.

The invention has been described with reference to example embodiments. Without departing from the scope of the applicable claims, a person skilled in the art will see numerous other options of implementing the invention, which do not have to be explained in detail herein.

LIST OF REFERENCE NUMERALS

1 Bumper cross-member
2 Outer shell
3 Inner shell
4, 4.1 Connecting flange
5, 5.1 Connecting flange
6 Hollow chamber section
7 Cut-out section
8 Hollow chamber section
9, 9.1 Crash box
10, 10.1, 10.2 Cut-out
11, 11.1 Cut-out opening
12, 12.1 Wall section
13, 13.1 Transition radius section
14, 14.1 Connecting flange

The invention claimed is:

1. A bumper cross-member for a vehicle, comprising:
an outer shell and an inner shell connected to the outer shell, and further having a cut-out section which comprises at least one cut-out passing through the bumper cross-member in the x-direction;
wherein the bumper cross-member is divided in the z-direction thereof into at least three sections, the at least three sections comprising a first hollow chamber section, a second hollow chamber section and the cut-out section, wherein the first hollow chamber section and the second hollow chamber section are separated by the cut-out section located therebetween;
wherein the cut-out is framed in at least one of the outer and inner shells by a peripheral wall section which extends from a flat side of the at least one shell through a transition radius section in the direction of the respective other shell.

2. The bumper cross-member of claim 1, wherein the peripheral wall section with its transition radius section is S-shaped.

3. The bumper cross-member of claim 1, wherein both the outer and inner shells of the bumper cross-member have the peripheral wall section.

4. The bumper cross-member of claim 3, wherein free end sections of the peripheral wall sections framing the cut-out lie flat against each other.

5. The bumper cross-member of claim 1, wherein the bumper cross-member is composed of the outer shell and the inner shell.

6. The bumper cross-member of claim 5, wherein sections of the cut-out section adjacent to the at least one cut-out in the y-direction form a joint hollow chamber with the first and second hollow chamber sections adjacent thereto in the z-direction.

7. The bumper cross-member of claim 1, wherein the outer shell and the inner shell are part of a multi-chamber extruded profile extending in the y-direction.

8. The bumper cross-member of claim 7, wherein the multi-chamber extruded profile is designed having three chambers and the cut-out section corresponds to a central chamber of the three chambers.

9. The bumper cross-member of claim 1, wherein the at least one cut-out has a preferred direction that follows the longitudinal extension of the bumper cross-member.

10. The bumper cross-member of claim 9, wherein the cut-out section of the bumper cross-member has a central cut-out and two cutouts arranged to the sides thereof.

11. The bumper cross-member of claim 1, wherein the first hollow chamber section has a greater extension in the z-direction than the second hollow chamber section, and the first hollow chamber section has connecting points for connecting a respective side member part.

12. The bumper cross-member of claim 11, wherein the connecting points are designed for connecting a respective crash element.

13. The bumper cross-member of claim 11, wherein the first hollow chamber section is the lower hollow chamber section of the bumper cross-member.

14. The bumper cross-member of claim 11, wherein the first hollow chamber section is the upper hollow chamber section of the bumper cross-member.

15. The bumper cross-member of claim 11, wherein the bumper cross-member includes a third hollow chamber section which is spaced apart from the first hollow chamber section by another cut-out section.

16. A bumper cross-member for a vehicle, comprising:
an outer shell and an inner shell connected to the outer shell, and further having a cut-out section which comprises at least one cut-out passing through the bumper cross-member in the x-direction;
wherein the bumper cross-member is divided in the z-direction thereof into at least three sections, the at least three sections comprising a first hollow chamber section, a second hollow chamber section and the cut-out section, wherein the first hollow chamber section and the second hollow chamber section are separated by the cut-out section located therebetween;
wherein the bumper cross-member is composed of the outer shell and the inner shell; and
wherein sections of the cut-out section adjacent to the at least one cut-out in the y-direction form a joint hollow chamber with the first and second hollow chamber sections adjacent thereto in the z-direction.

17. A bumper cross-member for a vehicle, comprising:
an outer shell and an inner shell connected to the outer shell, and further having a cut-out section which comprises at least one cut-out passing through the bumper cross-member in the x-direction;
wherein the bumper cross-member is divided in the z-direction thereof into at least three sections, the at least three sections comprising a first hollow chamber section, a second hollow chamber section and the cut-out section, wherein the first hollow chamber section and the second hollow chamber section are separated by the cut-out section located therebetween;
wherein the first hollow chamber section has a greater extension in the z-direction than the second hollow chamber section, and the first hollow chamber section has connecting points for connecting a respective side member part.

18. The bumper cross-member of claim 17, wherein the connecting points are designed for connecting a respective crash element.

19. The bumper cross-member of claim 17, wherein the first hollow chamber section is the lower hollow chamber section of the bumper cross-member.

20. The bumper cross-member of claim 17, wherein the first hollow chamber section is the upper hollow chamber section of the bumper cross-member.

21. The bumper cross-member of claim 17, wherein the bumper cross-member includes a third hollow chamber section which is spaced apart from the first hollow chamber section by another cut-out section.

* * * * *